US010003250B2

(12) United States Patent
Friedrich

(10) Patent No.: US 10,003,250 B2
(45) Date of Patent: Jun. 19, 2018

(54) MODULAR CONVERTER CIRCUIT HAVING SUB-MODULES, WHICH ARE OPERATED IN LINEAR OPERATION

(71) Applicant: SIEMENS AKTIENGESELLSCHAFT, München (DE)

(72) Inventor: Christian Friedrich, Schmelz/Hüttersdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 5 days.

(21) Appl. No.: 15/300,611

(22) PCT Filed: Mar. 13, 2015

(86) PCT No.: PCT/EP2015/055342
§ 371 (c)(1),
(2) Date: Sep. 29, 2016

(87) PCT Pub. No.: WO2015/150057
PCT Pub. Date: Oct. 8, 2015

(65) Prior Publication Data
US 2017/0214311 A1 Jul. 27, 2017

(30) Foreign Application Priority Data

Mar. 31, 2014 (EP) .................................... 14001179

(51) Int. Cl.
*H02M 1/12* (2006.01)
*H02M 7/537* (2006.01)

(52) U.S. Cl.
CPC ............. *H02M 1/12* (2013.01); *H02M 7/537* (2013.01)

(58) Field of Classification Search
CPC ................................ H02M 1/12; H02M 7/537
See application file for complete search history.

(56) References Cited

U.S. PATENT DOCUMENTS 5,886,504 A * 3/1999 Scott .................... B23K 9/1062
322/15
6,058,031 A * 5/2000 Lyons ................... H02M 7/487
363/132

(Continued)

FOREIGN PATENT DOCUMENTS

| CN | 101911463 A | 12/2010 |
|---|---|---|
| DE | 101 03 031 A1 | 7/2002 |
| WO | WO 2011/124260 A1 | 10/2011 |

*Primary Examiner* — Jue Zhang
(74) *Attorney, Agent, or Firm* — Henry M. Feiereisen LLC

(57) ABSTRACT

A converter circuit includes a direct-voltage connection and a phase module which includes connections electrically connected to the direct-voltage connection, and a series connection of an upper converter valve and a lower converter valve. The upper and lower converter valves have each at least two sub-modules arranged electrically in series and including at least one capacitor, at least one power semiconductor, and a control assembly configured to control the power semiconductor. At least one of the sub-modules is configured for linear operation, with a control assembly configured to enable the linear operation of the sub-module. At least one alternating-voltage-side connection is provided and defined by an electrical link between the upper converter valve and the lower converter valve.

17 Claims, 4 Drawing Sheets

(56) References Cited

U.S. PATENT DOCUMENTS

2008/0310205 A1* 12/2008 Hiller .................... H02M 7/483
    363/131
2010/0328977 A1   12/2010 Asplund
2011/0096580 A1*  4/2011 Asplund ................... H02J 3/36
    363/132

* cited by examiner

MODULAR CONVERTER CIRCUIT HAVING SUB-MODULES, WHICH ARE OPERATED IN LINEAR OPERATION

CROSS-REFERENCES TO RELATED APPLICATIONS

This application is the U.S. National Stage of International Application No. PCT/EP2015/055342, filed Mar. 13, 2015, which designated the United States and has been published as International Publication No. WO 2015/150057 and which claims the priority of European Patent Application, Serial No. 14001179.2, filed Mar. 31, 2014, pursuant to 35 U.S.C. 119(a)(d).

BACKGROUND OF THE INVENTION

The invention relates to a converter circuit having
a direct-voltage connection,
at least one alternating-voltage-side connection and
at least one phase module,
wherein the phase module has a series connection of an upper and a lower converter valve,
wherein an electrical link between the upper and the lower converter valve represents the alternating-voltage-side connection,
wherein connections of the phase module are electrically connected to the direct-voltage connection,
wherein the upper and the lower converter valve each have at least two sub-modules which are arranged electrically in series,
wherein the sub-modules have at least one capacitor and at least one power semiconductor.

Converters are used to convert electrical power in respect of voltage level, current level, frequency and phase position. Converters for the conversion of alternating voltage into direct voltage or of alternating current into direct current are referred to as rectifiers. In contrast, converters for the conversion of direct voltage into alternating voltage or of direct current into alternating current are referred to as inverters. Converters for the conversion of outputs with voltages/currents of one frequency into another frequency are referred to as (frequency) converters.

Converters are used to supply electrical energy to electric machines and motors in a targeted manner. As a result, these electric machines and motors can be controlled and regulated by the converters. A further field of application is the control of energy flows, the compensation of harmonic waves and the provision of reactive power in power supply networks. Moreover converters are involved in the low-loss transmission of energy by means of high voltage direct current transmission (HVDC).

In the description of the alternating-voltage-side output voltage of converters, a distinction is made between a line-to-line voltage, which is applied between the individual alternating-voltage-side outputs of the converter, a voltage between an output and a reference potential, also referred to as conductor voltage, and a zero sequence component. The zero sequence component is formed by the conductor voltages being added and being divided by the number of conductors. In this way the voltage of the zero sequence component has no influence on the line-to-line voltage.

On a power electronics basis, a periodic alternating voltage can be generated in two ways with the aid of converters:
pulse-frequency switching (pulse width modulation)
linear setting/regulating.

With pulse-frequency switching, semiconductors in any topology are controlled with a frequency which is significantly higher than the frequency of the output voltage. The voltage waveform is impressed by way of a variable pulse width. Upstream energy stores smooth current and voltage. In addition to the desired voltage, a high-frequency interference remains on the output variables, which can be reduced by a correspondingly high filter requirement, but cannot, in most cases, be completely eliminated. In order to obtain a high-quality output voltage, the largest possible pulse frequency must be used for switching. Energy stores and filters on the output side must be dimensioned sufficiently large. Both considerably reduce the overall degree of efficiency of the system and are associated with high costs.

Any output voltage waveform can be adjusted without high-frequency interferences using a linear actuator by way of opening and reducing the semiconductor valves in a targeted manner. In this way the voltage difference between the DC voltage and the alternating voltage in the semiconductor is entirely converted into heat. Depending on the phase control factor and the curve shape, more thermal energy is converted in the semiconductor than is output electrically outwards. Smaller phase control factors reduce the degree of efficiency. The linear actuator is therefore only used extremely seldomly in power engineering on account of its very high losses. Due to the high requirement for cooling, only applications with relatively small outputs can be realized effectively.

Furthermore, a modular multi-level converter is known from DE 101 03 031 A1. In this design, an output voltage with minimal harmonic waves can already be generated, since the output voltage generated with the modular multi-level converter represents an echelon form. Filters for eliminating harmonic waves can be realized in a particularly small and economical manner with this converter.

The object underlying the invention is to specify a cost-effective and reliable modular multi-level converter, the output voltage of which can assume a sinusoidal curve without containing interfering harmonic waves in the process.

SUMMARY OF THE INVENTION

This object is achieved by a converter circuit in that at least one converter valve has a sub-module suitable for linear operation and that the converter circuit has a control assembly which enables the linear operation of the sub-module suitable for linear operation.

The knowledge underlying the invention is that the harmonic waves in the alternating-voltage-side output voltage can be reduced in that at least one sub-module is suitable for linear operation. By means of this operating mode, the voltage of the one sub-module can be changed continuously so that there are no jumps in the output voltage. Any continuous voltage curve can thus be generated at the output. Here the generation of a sinusoidal curve as an output voltage of a converter is particularly advantageous. Since the jumps in the output voltage cause harmonic waves in the output voltage, the harmonic waves can be avoided with a continuous change in the output voltage. There is provision for at least one sub-module of at least one phase module to be operated in linear operation. With n sub-modules arranged in series, this thus produces n−1 sub-modules with low losses on account of the pulse-frequency switching. Only one module is operated with larger losses. Since only a fraction of the intermediate circuit voltage is applied hereto however, this module also only causes a fraction of the losses which a hitherto known linear actuator causes. On account of significantly lower cooling requirements, it can thus be produced and also operated more easily. On account of the low losses, converters with large outputs can also be realized, which provide a purely sinusoidal output voltage at the alternating-voltage-side output.

Contrary to the already known linear actuators, this converter circuit already has a high degree of efficiency on account of its number of sub-modules arranged in series.

The combined use of semiconductors in switched and linear operation produces a highly efficient transformation of electrical voltage or electrical current from an identical magnitude into an ideal periodic alternating variable of any amplitude, frequency and shape. By means of the large number of sub-modules which are connected in series, the switching power of each semiconductor with the use of n sub-modules per phase module is less by the factor n than with conventional 2-point inverters, as a result of which the power loss in linear operation reduces to a factor <1/n. With a corresponding layout, the low voltage of the sub-module permits the control electronics of the sub-module to be supplied directly from this sub-module without an upstream converter.

The converter circuit is thus also especially suitable for use for measuring and testing purposes, since it can generate a required voltage curve precisely.

In an advantageous embodiment, the converter circuit has a number of phase modules, which are arranged in a parallel connection in respect of one another. With an arrangement of this type, multiphase, in particular three-phase, components can also be connected with the alternating-voltage-side load connections. A sinusoidal output voltage can thus also be made available to these multiphase components with the aid of the inventive converter circuit.

In a further advantageous embodiment, each phase module has at least one sub-module suitable for linear operation. The advantage of this embodiment consists in it being possible to influence the output voltage of all alternating-voltage-side connections with the sub-modules disposed in the linear operation such that any continuous time curve, in particular sinusoidal curve, of the output voltage, can be realized at the alternating-voltage-side connections. This means that the portion of harmonic waves of a sinusoidal curve is equal to or almost zero.

In a further advantageous embodiment, each upper and each lower converter valve has at least one sub-module suitable for linear operation. The advantage of this arrangement consists in producing a symmetry between the positive and negative potential of the intermediate circuit. Aside from providing continuous time curves of the output voltage, this enables circular currents, which can be used to balance the capacitor voltages of the individual sub-modules, to be regulated more easily. Furthermore, a zero sequence component of the alternating-voltage-side output voltage can be more easily influenced by this arrangement. As a result, negative effects, such as e.g. bearing currents in motors, can be avoided or at least significantly reduced.

In a further advantageous embodiment, the sub-module suitable for linear operation and the remaining sub-modules have power semiconductors with the same voltage blockability. This sub-module suitable for linear, operation can be produced particularly easily. On account of the same voltage blockability, the same components can be used in all sub-modules. This property increases the number of non-variable parts in the converter, so that this can be produced easily and cost-effectively.

In a further advantageous embodiment, the converter circuit has a regulating apparatus, which is electrically connected to the control assemblies, wherein a target value for the voltage between the alternating-voltage-side connection and a reference potential can be predetermined to the regulating apparatus and wherein the converter circuit can be operated such that the voltage between the alternating-voltage-side connection and a reference potential corresponds to the target value. In this way this target value is not only achieved over the averaged time, such as is possible with pulse-width-modulated (PWM) voltages. The target value is achieved at any point in time. However, a slight time delay between the target value specification and realizing the output voltage which corresponds to the target value is to be expected on account of signal transit times and response times in the control path. Any variations in time can thus be predetermined in order to regulate the converter circuits, said variations in time producing the converter circuit as a voltage compared with the reference potential at the alternating-voltage-side connection.

In a further advantageous embodiment, the converter circuit has a regulating apparatus, which is electrically connected to the control assemblies, wherein a target value for the voltage between two alternating-voltage-side connections can be predetermined to the regulating apparatus and wherein the converter circuit can be operated such that the voltage between two alternating-voltage-side connections corresponds to the target value. This exemplary embodiment corresponds in principle to the afore-cited, wherein the regulation is, however, not aligned with a voltage between an alternating-voltage-side connection and reference potential but instead with the voltage between two alternating-voltage-side connections.

In a further advantageous embodiment, the voltage between two alternating-voltage-side connections or the voltage between the alternating-voltage-side connection and a reference potential can be generated as a sinusoidal curve. The particular advantage consists in the sinusoidal curve being required for many applications and having to be realized in the past by more or less complicated and costly filter connections. It is now possible to dispense with this filter connection. Upon connection to a power supply network for instance, no high-frequency interfering currents develop on account of the good sinusoidal curve of the output voltage of the converter circuit. The same applies to loads connected to the converter circuit. These are also partly sensitive to harmonic waves, which do not occur with the inventive converter circuit.

The converter circuit is thus also especially suited to use for measuring and testing purposes, since it can generate a required voltage curve precisely.

In a further advantageous embodiment, the power semiconductors of the sub-module suitable for linear operation have field effect transistors, in particular MOSFETS. To that effect these are particularly optimized to realizing a linear operation. A sub-module suitable for linear operation can be realized simply, cost-effectively and reliably particularly with these semiconductor elements.

BRIEF DESCRIPTION OF THE DRAWING

The invention is described and explained in more detail below with the aid of the exemplary embodiments shown in the Figures, in which.

DETAILED DESCRIPTION OF PREFERRED EMBODIMENTS

Figure 1:
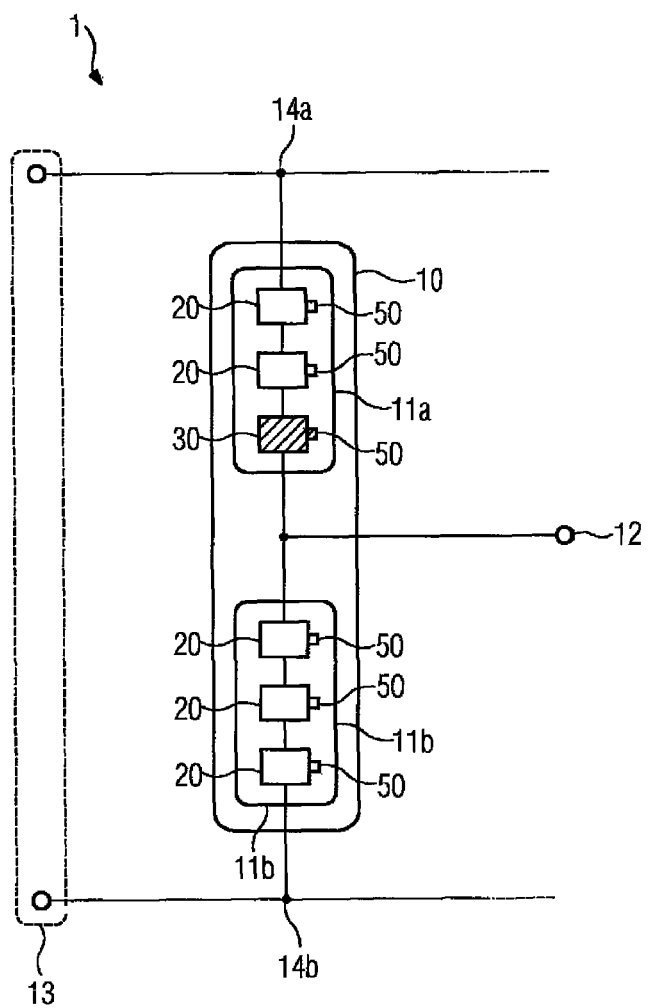
FIG. 1 shows a phase of an inventive converter circuit

FIG. 1 shows an exemplary embodiment of the inventive converter circuit 1. This has a direct-voltage connection 13. The phase module 10 is connected hereto with its connections 14a, 14b. The phase module 10 comprises the series connection of an upper converter valve 11a and a lower converter valve 11b. The connecting point of these two converter valves 11a, 11b forms the alternating-voltage-side connection 12. The two converter valves 11a and 111b in turn each have a series connection of sub-modules 20, 30. Each of these sub-modules is connected to a control assembly, which is advantageously arranged in the vicinity of the sub-module 20, 30 or even within the sub-module 20, 30. In the exemplary embodiment shown, the upper converter valve has a sub-module 30 suitable for linear operation. This is controlled by way of its control assembly 50 such that compared with a reference potential a voltage with a continuous variation in time can be generated at the alternating-voltage-side output. With the realization of a sinusoidal curve of the output voltage, this can be realized without harmonic wave parts.

To regulate currents within the converter circuit 1, it has proven advantageous if an inductance is present in series with the sub-modules 20, 30. This is particularly advantageous for multi-phase alternating-voltage-side output voltages, in order to generate circular currents so as to balance the capacitor voltages.

Figure 2:
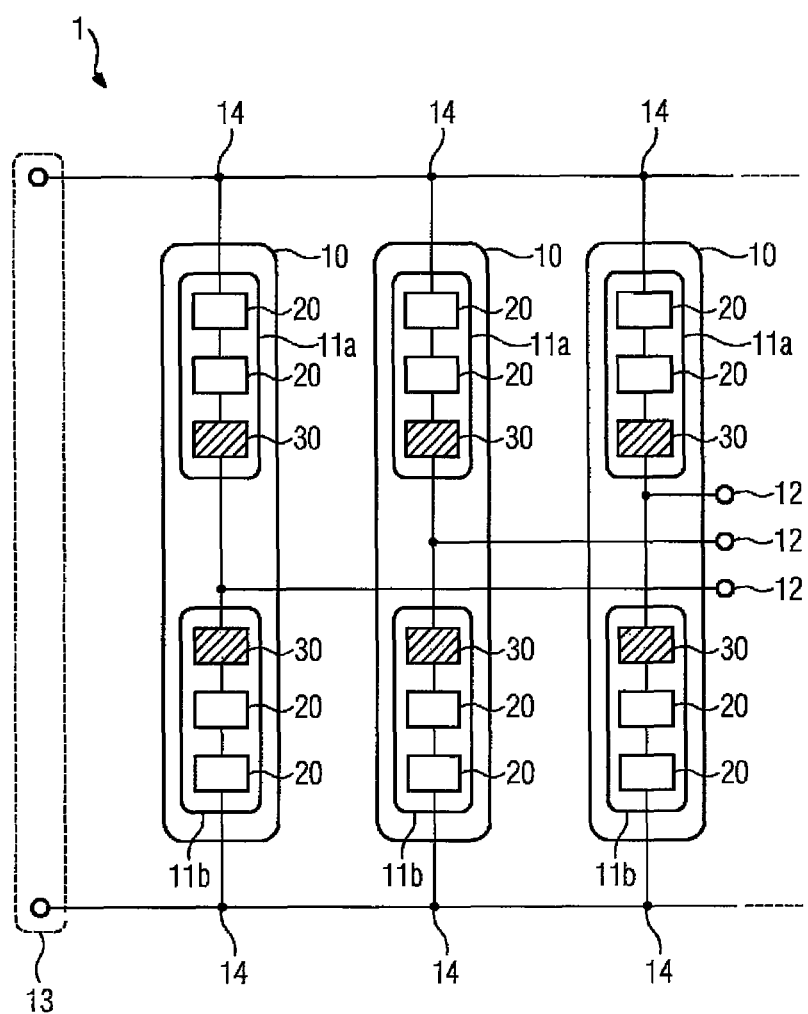
FIG. 2 shows a three-phase inventive converter circuit

FIG. 2 shows a further exemplary embodiment of the inventive converter circuit 1. To avoid repetitions in respect of concordant component parts of the system, reference is made to the description in respect of FIG. 1 and the reference characters cited there. Contrary to the preceding exemplary embodiment, this converter circuit 1 is embodied with three-phase alternating-voltage-side connections 12. These are particularly suited to connection to a power supply network. The power supply network represents a three phase current here. Similarly, electrical loads, such as motors for instance, can be energized using the three alternating-voltage-side connections, said motors requiring a voltage source which can be modified in terms of voltage level and frequency in order to control its rotational speed and its torque. On account of the voltage curve at the output, these loads can be operated without a filter connection.

Each converter valve has a sub-module 30 suitable for linear operation in the series connection of the sub-modules 20, 30. This design is thus symmetrical, on the one hand, in respect of the individual phase modules 10 and thus also in respect of the alternating-voltage-side connections 12. The voltages generated at the alternating-voltage-side connections can thus all generate, similarly, a correspondingly predeterminable voltage curve. Since each upper and lower converter valve 11a, 11b of each phase module 10 in this exemplary embodiment has a sub-module 30 suitable for linear operation, the voltages of the alternating-voltage-side connections of each phase module 10 can be predetermined independently of one another.

On account of the precise sinusoidal shape at the alternating-voltage-side connections, this converter circuit is also especially suited to measuring and testing purposes, which make particularly high requirements on the voltage waveform of a voltage source.

Figure 3:
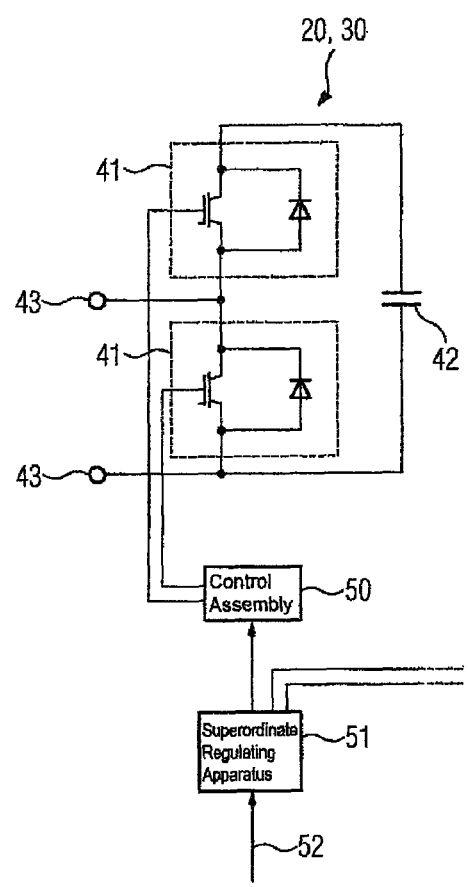
FIG. 3 shows a sub-module of the inventive converter circuit with control unit and regulating apparatus and FIG. 4 shows a sub-module with MOSFETS as power semiconductors.

FIG. 3 shows an exemplary embodiment of a sub-module 20, 30. This comprises two semiconductors 41 connected in series and a capacitor 42 arranged in parallel to this series circuit. At the connection terminals 43 of the sub-module, the voltage of the capacitor or the voltage can be applied as zero to the sub-modules operated in linear operation. The power semiconductors 41 are controlled by means of the control assembly 50. If this control assembly 50 is able to operate the sub-module not only as described above in switching operation but also enables linear operation of the sub-module 30, then in the case of this sub-module 30 suitable for linear operation any voltage of the voltage 0 and the voltage of the capacitor can be applied at the terminal plugs 43 of the sub-module 30. The specification as to which voltage value is to be adjusted is received by the control assembly 50 from the superordinate regulating apparatus 51. This regulating apparatus 51 controls the individual control assemblies 50 with the information as to which voltage the relevant sub-module 20,30 has to supply to its terminal plugs 43. With sub-modules 20 disposed in the switching operation, there is only one item of digital information OV or Uc here, whereas the sub-modules 30 operated in linear operation obtain a precise voltage value from the superordinate regulating apparatus 51. The regulating apparatus 51 in turn determines these control signals on the control assemblies 50 from the specification of a target value 52. It has proven to be particularly advantageous if the regulating apparatus has information relating to the phase currents and the voltages at the alternating-voltage-side connections 12 of the converter circuit 1.

Figure 4:
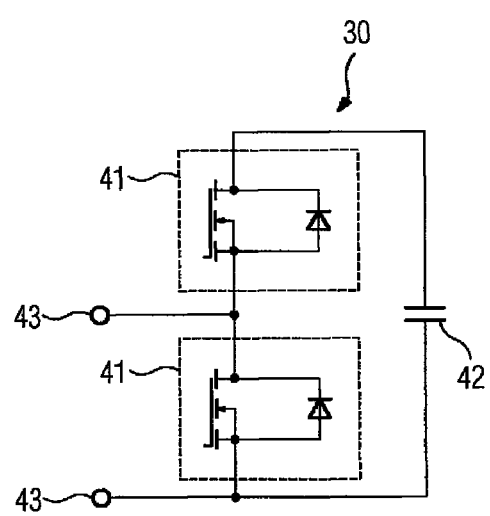

FIG. 4 shows the design of a sub-module 30 with MOSFETS suitable for linear operation. MOSFETS are used here for the power semiconductors 41 of the sub-module 30.

Although the invention has been illustrated and described in greater detail by the preferred exemplary embodiments, the invention is not limited by the disclosed examples and other variations can be derived herefrom by the person skilled in the art without departing from the scope of protection of the invention.

What is claimed is:

1. A converter circuit, comprising:
a direct-voltage connection;
a phase module including connections electrically connected to the direct-voltage connection, and a series connection of an upper converter valve and a lower converter valve, said upper and lower converter valves having each at least two sub-modules arranged electrically in series and including at least one capacitor, at least one power semiconductor, and a control assembly configured to control the power semiconductor, at least one of the sub-modules configured for linear operation;
a control assembly configured to enable the linear operation of the sub-module; and
at least one alternating-voltage-side connection defined by an electrical link between the upper converter valve and the lower converter valve.

2. The converter circuit of claim 1, further comprising a plurality of phase modules arranged in a parallel circuit with respect to one another.

3. The converter circuit of claim 2, wherein each of the phase module has at least one sub-module configured for linear operation.

4. The converter circuit of claim 1, wherein each of the upper and lower converter valves has at least one sub-module configured for linear operation.

5. The converter circuit of claim 1, wherein the sub-module configured for linear operation and a remaining one of the sub-modules include power semiconductors with equal voltage blockability.

6. The converter circuit of claim 1, further comprising a regulating apparatus electrically connected to the control assembly, with a target value for a voltage between the alternating-voltage-side connection and a reference potential being predeterminable to the regulating apparatus, said converter circuit being operable such that the voltage between the alternating-voltage-side connection and a reference potential corresponds to the target value.

7. The converter circuit of claim 1, further comprising a regulating apparatus electrically connected to the control assembly, with a target value for a voltage between two of said alternating-voltage-side connection is predeterminable to the regulating apparatus, said converter circuit being operable such that the voltage between the two alternating-voltage-side connections corresponds to the target value.

8. The converter circuit of claim 7, wherein the voltage between the two alternating-voltage-side connections is generated as a sinusoidal curve.

9. The converter circuit of claim 6, wherein the voltage between the alternating-voltage-side connection and the reference potential is generated as a sinusoidal curve.

10. The converter circuit of claim 1, wherein the power semiconductor of the sub-module configured for linear operation includes a MOSFET as field effect transistor.

11. A method for operating a converter circuit, comprising:
electrically connecting a phase module to a direct-voltage connection;
connecting converter valves of the phase module in series, with each of the converter valves having at least two sub-modules arranged electrically in series; and
operating at least one of the sub-modules in at least one of the converter valves in linear operation.

12. The method of claim 11, further comprising providing a plurality of said phase module, with at least one sub-module being operated in linear operation in each phase module.

13. The method of claim 11, wherein each of the converter valves has at least one sub-module configured for linear operation.

14. The method of claim 11, further comprising adjusting an operating point of the at least one of the sub-modules, when operated in linear operation, such that a voltage is generated in relation to a reference potential at an alternating-voltage-side connection, defined by an electrical link between the converter valves, which voltage corresponds to a target value predetermined to a regulating apparatus that is electrically connected to a control assembly of the at least one sub-module.

15. The method of claim 11, further comprising adjusting an operating point of the at least one of the sub-modules, when operated in linear operation, such that a voltage is generated between two alternating-voltage-side connections, defined by an electrical link between the converter valves, which voltage corresponds to a target value predetermined to a regulating apparatus that is electrically connected to a control assembly of the at least one sub-module.

16. The method of claim 15, further comprising generating the voltage between the two alternating-voltage-side connections in the form of a sinusoidal curve which is free of harmonic waves.

17. The method of claim 16, further comprising generating the voltage between the alternating-voltage-side connection and the reference potential in the form of a sinusoidal curve which is free of harmonic waves.

* * * * *